Figure 1:
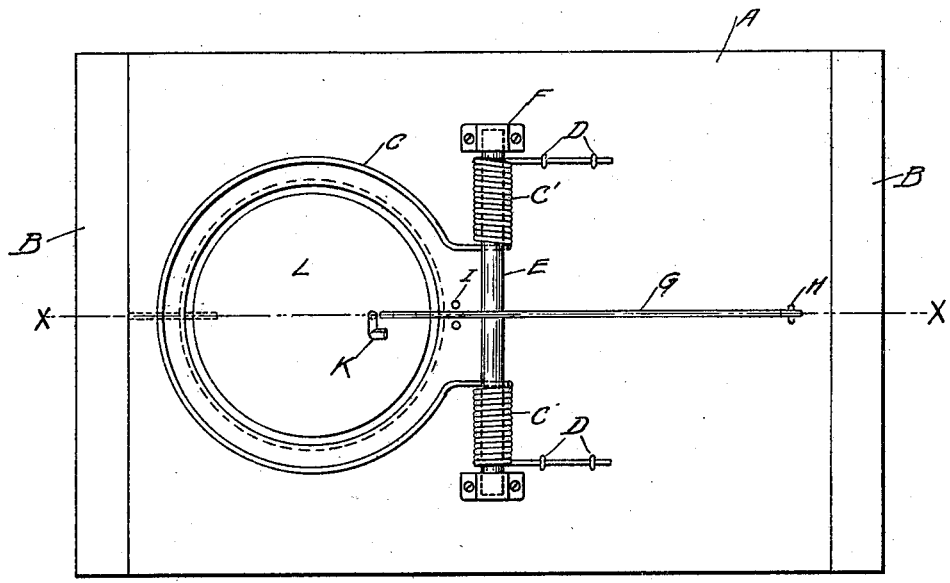

E. M. ALDERMAN.
ANIMAL TRAP.
APPLICATION FILED JUNE 21, 1909.

975,741.

Patented Nov. 15, 1910.

WITNESSES:—

INVENTOR
ELI M. ALDERMAN
PER

ATTORNEY.

UNITED STATES PATENT OFFICE.

ELI M. ALDERMAN, OF HICKORY TOWNSHIP, MERCER COUNTY, PENNSYLVANIA.

ANIMAL-TRAP.

975,741.    Specification of Letters Patent.    Patented Nov. 15, 1910.

Application filed June 21, 1909. Serial No. 503,452.

*To all whom it may concern:*

Be it known that I, ELI M. ALDERMAN, a citizen of the United States, residing in Hickory township, county of Mercer, and State of Pennsylvania, have invented certain new and useful Improvements in Animal-Traps, of which the following is a specification.

This invention relates to an improvement in animal traps and is directed more especially to a trap for rodents.

One of the objects of this invention is to provide means operative from a plurality of directions for springing the ordinary form of rat trap.

Another object is to provide a trap in which the bait lies loose and is adapted to attract and may be eaten by a large number of rats or other rodents at one time.

Another object is to construct a trap which will be powerful, simple in construction and safe when being set.

Further objects and ends of the invention will appear from an inspection of the specification following, and the drawing.

The invention accordingly consists in the features of construction, combination of elements, and arrangement of parts which will be exemplified in the construction hereinafter set forth, and the scope of the application of which will be indicated in the claims.

Figure 2:
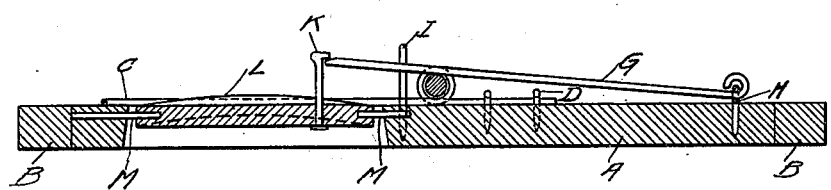

In the accompanying drawing wherein is illustrated one of the possible embodiments of my invention; Figure 1 represents a plan view of my trap with the spring shown in a position after the trap has been sprung. Fig. 2 represents a vertical cross section taken on the line XX of Fig. 1 with the platform L in a slightly tilted position.

Referring to the two figures in which like reference characters represent like parts, A is an ordinary board near one end of which is cut out by barrel saw or other suitable means a circular aperture.

B represents end pieces which are nailed to the main section after the trap is otherwise completed.

C is an ordinary trap spring constructed of spring wire and coiled at C' into helical windings and extended rearwardly to be secured to the board A by means of staples D. Extending through the helical windings of the spring is a wooden roller E fastened at its two ends by means of clamps F secured to the board A by ordinary screws or nails.

H represents an eyelet or other suitable means for fastening one end of the catch wire G which is maintained when set in line substantially parallel to the sides of the board by means of wire standards I.

L is a circular board smaller in diameter than the aperture in the trap base and of about half the thickness of said base board A. This platform L is pivoted by means of suitable pivot rods M so as to have a tilting motion on a line parallel to and in a line with the trap wire G when the latter is in set position. Secured to the platform L is a catch K with a head bent at right angles to the upright part of the catch and directed toward the rear of the trap.

To set the trap the wire G is thrown back and the spring C bent back so as to lie flat upon the rear of the base. The spring thus under tension is retained in this position by bringing the catch wire G back to the position as shown in Fig. 2 and centering the catch K over the end of the wire G. The platform L may now be baited by throwing meal or other loose grain upon it and while an animal may eat freely of the grain while standing on the base yet the first pressure of the animal's body upon any part of the platform L will tilt this platform on its pivotal supports thus drawing the catch K away from the end of the wire G. This wire G prevented from lateral movement by the standards I will upon the tilting of L and the withdrawal of catch K be thrown back by the spring which will instantly assume the position shown in the two figures, catching in its spring any animals across its line of motion.

It will be thus seen that I have constructed a trap in which the bait may be placed in position without exposing the hands of the operator to danger of injury. Likewise that the construction of the trap is such that a number of rats or other animals may be feeding upon the meal or other bait before the trap is sprung.

Other advantages obtained in the present invention will appear from an inspection of the drawing and the principles embodied therein.

While I have described one method of carrying out my invention, it should be understood that changes may be made without departing from the spirit of my invention.

Having thus described my invention what I claim as new and desire to secure by Letters Patent is,

1. In an animal trap, the combination of a base having a circular aperture therein pivotal supports in said aperture a circular platform in said aperture adapted to swing on said pivotal supports, an L shaped catch extending up from said platform, a substantially circular spring adapted, when sprung, to surround said aperture, a catch wire coöperating with the platform catch to hold said spring under tension; said pivotal supports, catch, and catch wire being in alinement when the trap is set; and standards located on either side of the catch wire for preventing the lateral play of the latter when the platform is tilted, substantially as shown and described.

2. In an animal trap, a substantially circular spring, a member upon which said spring is mounted and adapted to rotate means for holding said spring under tension a circular platform, axles lying in line with the retaining means, upon which said platform is tilted in either direction to release the spring, substantially as shown and described.

3. In an animal trap, a trap spring, a member upon which said spring is mounted and adapted to rotate, means for holding said spring under tension, a platform provided with a catch for said means, axles in line with the diameter of said platform, and upon which said platform is pivoted whereby a tilting of the platform by pressure on either side of the axles will release the spring, substantially as shown and described.

4. In an animal trap, the combination of a base board provided with a circular aperture near one end, a circular platform having a smaller diameter than the latter, pivoted at the two ends of one of its diameters within the aperture, a substantially circular spring adapted, when sprung, to surround said aperture, a member upon which said spring is mounted and adapted to rotate means comprising a wire and catch for retaining said spring under tension, said catch being fixed to the platform and standards positioned on either side of said retaining wire for preventing the lateral play thereof, substantially as shown and described.

5. In an animal trap, the combination of the base board A, provided with a circular aperture near one end, the circular platform L swinging in said aperture on the pivotal supports M, a wire spring comprising the circular loop C and the helical windings C′, the retaining wire G for holding said loop C in tensioned position, said wire G and supports M being in line with each other the standards I for preventing lateral play of the wire G, and the catch K, fixed to the platform and adapted to lock the wire G, as and for the purpose set forth.

6. In an animal trap, the combination of a substantially circular wire spring, means comprising a wire and catch for retaining said spring under tension, and pivoted means upon which said catch is fixed comprising a circular platform adapted to be swung in opposite directions, whereby the retaining means and spring are released upon the swinging of the pivoted means in either direction, substantially as shown and described.

In testimony whereof, I affix my signature in the presence of two witnesses.

E. M. ALDERMAN.

Witnesses:
 GERALD C. DIXON,
 JOHN C. WILKES.